US011526929B2

(12) United States Patent
Reynolds et al.

(10) Patent No.: US 11,526,929 B2
(45) Date of Patent: Dec. 13, 2022

(54) ECOMMERCE ESSENTIAL ORDER FULFILLMENT

(71) Applicant: International Business Machines Corporation, Armonk, NY (US)

(72) Inventors: Spencer Thomas Reynolds, Austin, TX (US); Zachary A. Silverstein, Jacksonville, FL (US); Jacob Ryan Jepperson, St. Paul, MN (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 19 days.

(21) Appl. No.: 17/005,610

(22) Filed: Aug. 28, 2020

(65) Prior Publication Data
US 2022/0067815 A1 Mar. 3, 2022

(51) Int. Cl.
*G06Q 30/06* (2012.01)
*G06Q 10/08* (2012.01)
*G06Q 10/10* (2012.01)
*G06Q 50/28* (2012.01)
*G06Q 30/02* (2012.01)

(52) U.S. Cl.
CPC ....... *G06Q 30/0635* (2013.01); *G06Q 10/087* (2013.01); *G06Q 30/0201* (2013.01); *G06Q 30/0637* (2013.01); *G06Q 50/28* (2013.01); *G06Q 10/10* (2013.01); *G06Q 30/0603* (2013.01)

(58) Field of Classification Search
None
See application file for complete search history.

(56) References Cited

U.S. PATENT DOCUMENTS

| 7,966,214 | B2 | 6/2011 | Denton et al. |
| 8,165,926 | B2 * | 4/2012 | Crossgrove ........ G06Q 30/0613 |
| | | | 705/26.81 |
| 9,846,853 | B2 | 12/2017 | Ertas |
| 10,242,336 | B1 | 3/2019 | Agarwal et al. |
| 10,242,338 | B2 | 3/2019 | High et al. |
| 10,332,297 | B1 * | 6/2019 | Vadodaria ............. G06F 3/0486 |
| 10,417,690 | B2 | 9/2019 | Mueller et al. |
| 10,636,079 | B2 | 4/2020 | Shiely et al. |

(Continued)

OTHER PUBLICATIONS

Ambe, Intaher M., "Determining an Optimal Supply Chain Strategy," Journal of Transport and Supply Chain Management, vol. 6, Issue 1, pp. 126-147, Jan. 2012, 22 pages. (Year: 2012).*

(Continued)

*Primary Examiner* — Nicholas D Rosen
(74) *Attorney, Agent, or Firm* — Stephanie L. Carusillo

(57) ABSTRACT

In an approach to modifying the essentialness of an ecommerce order, one or more computer processors receive an order for a product from a customer. One or more computer processors determine the product is deemed non-essential. One or more computer processors notify the customer that the product is non-essential. One or more computer processors receive a justification of an essentialness of the product from the customer. One or more computer processors analyze a sentiment of the justification. Based on the analysis of the sentiment, one or more computer processors determine the product is essential. One or more computer processors process the order as essential.

20 Claims, 3 Drawing Sheets

(56) References Cited

U.S. PATENT DOCUMENTS

| | | | |
|---|---|---|---|
| 10,664,801 B1 | 5/2020 | Rosenfeld et al. | |
| 10,692,121 B2* | 6/2020 | Stephenson | G06Q 50/28 |
| 2005/0086130 A1* | 4/2005 | Crossgrove | G06Q 30/0635 |
| | | | 705/26.41 |
| 2005/0280576 A1* | 12/2005 | Shemesh | G01S 19/48 |
| | | | 342/464 |
| 2009/0110275 A1* | 4/2009 | Ahmed | G06F 16/353 |
| | | | 382/170 |
| 2010/0262921 A1* | 10/2010 | Boyer | H04L 51/00 |
| | | | 715/752 |
| 2015/0262258 A1* | 9/2015 | Schonbeck | G06Q 30/0272 |
| | | | 705/14.54 |
| 2016/0110788 A1* | 4/2016 | Stephenson | G06Q 30/0201 |
| | | | 705/7.29 |
| 2017/0011449 A1 | 1/2017 | Mueller et al. | |
| 2020/0380080 A1* | 12/2020 | Glunz | G05B 19/41865 |

OTHER PUBLICATIONS

Anonymous et al., "Differentiating delivery: How to win the eCommerce battle", Accenture Consulting, Copyright © 2016, 17 pages.
Anonymous et al., "Fast Moving Consumer Goods Analytics Framework", Deloitte, Amsterdam, 2017, 50 pages.
Anonymous et al., "JD Edwards EnterpriseOne Fulfillment Management", Oracle Data Sheet, Copyright © 2016, 3 pages.
Anonymous et al., "Supply Chain Analytics Market Size, Share, & Trends Analysis Report By Solution, By Service, By Deployment, By Enterprise Size, By End-use, By Region, And Segment Forecasts, 2019-2025", Grand View Research, Aug. 2019, 7 pages.
Authors et al. Disclosed Anonymously, "AIAPPS: AI Driven Fulfillment Optimization Using Exception Recommendations for FIFO Inventory Management in a Supply Chain", An IP.com Prior Art Database Technical Disclosure, IP.com No. IPCOM000261679D, IP.com Electronic Publication Date: Mar. 27, 2020, 6 pages.
Authors et al. Disclosed Anonymously, "Prioritizing order fulfillment to optimize delivery costs", An IP.com Prior Art Database Technical Disclosure, IP.com No. IPCOM000252069D, IP.com Electronic Publication Date: Dec. 14, 2017, 7 pages.
Authors et al. Disclosed Anonymously, "System and Method for Ecommerce Catalogue Sorting for Optimized Delivery Fulfillment", An IP.com Prior Art Database Technical Disclosure, IP.com No. IPCOM000261785D, IP.com Electronic Publication Date: Apr. 3, 2020, 3 pages.
Dillet, Romain, "France launches marketplace to manage essential products against COVID-19", TechCrunch, Mar. 25, 2020, 8 pages.
Hu et al., "Amazon warehouses receive only vital supplies in U.S., Europe amid coronavirus", Reuters, Mar. 17, 2020, 3 pages.
IBM, "IBM Sterling Supply Chain Suite", Printed Aug. 17, 2020, 7 pages.
IBM, "What is supply chain analytics?", Aug. 17, 2020, 12 pages.
Matsakis, Louise, "Amazon's New 'Essential Items' Policy is Devastating Sellers", Wired, Mar. 24, 2020, 7 pages.
Spangler, Todd, "Amazon is Restocking Only Essential Products, Suspending Other Supplier Shipments to Warehouses", Variety, Mar. 18, 2020, 8 pages.

* cited by examiner

ECOMMERCE ESSENTIAL ORDER FULFILLMENT

BACKGROUND OF THE INVENTION

The present invention relates generally to the field of ecommerce, and more particularly to modifying the essentialness of an ecommerce order.

In business and finance, supply chain is a system of organizations, people, activities, information, and resources involved in moving a product or service from supplier to customer. Supply chain activities involve the transformation of natural resources, raw materials, and components into a finished product that is delivered to the end customer.

Electronic commerce (referred to herein as "ecommerce") is a growing sector of the U.S. and world economies. Ecommerce is the activity of electronically buying or selling products or online services over the Internet. Ecommerce draws on technologies such as mobile commerce, electronic funds transfer, supply chain management, Internet marketing, online transaction processing, electronic data interchange (EDI), inventory management systems, and automated data collection systems. Ecommerce is in turn driven by the technological advances of the semiconductor industry and is the largest sector of the electronics industry.

SUMMARY

Embodiments of the present invention disclose a computer-implemented method, a computer program product, and a system for modifying the essentialness of an ecommerce order. The computer-implemented method one or more computer processors receiving an order for a product from a customer. One or more computer processors determine the product is deemed non-essential. One or more computer processors notify the customer that the product is non-essential. One or more computer processors receive a justification of an essentialness of the product from the customer. One or more computer processors analyze a sentiment of the justification. Based on the analysis of the sentiment, one or more computer processors determine the product is essential. One or more computer processors process the order as essential.

DETAILED DESCRIPTION

During a time of a national or global emergency, for example, a pandemic, ecommerce retailers or entities may prioritize delivery of products considered "essential" to the larger community response to the emergency. Ecommerce entities may not take into account various impacts that the emergency may have on individual consumers and the consumers' urgent need for shipping of one or more items. Thus, there is a need for a method with which consumers can justify the importance, i.e., the "essentialness," of a product such that the product qualifies as essential within the supply chain policy of the ecommerce entity. Embodiments of the present invention recognize that improvements may be made to order processing, fulfillment, and delivery by providing the ability to justify modifications to order processing and fulfillment supply chain, as well as delivery prioritization, that would benefit many individual consumers. Embodiments of the present invention address an ecommerce order management fulfillment issue by providing a justification model policy change for circumventing usual product characterization by an ecommerce entity within the supply chain. Embodiments of the present invention also recognize that efficiency may be gained by determining which products are essential and should be prioritized when shipping capacity is limited and demand for essential products is high, such as during a natural disaster. Implementation of embodiments of the invention may take a variety of forms, and exemplary implementation details are discussed subsequently with reference to the Figures.

Figure 1:
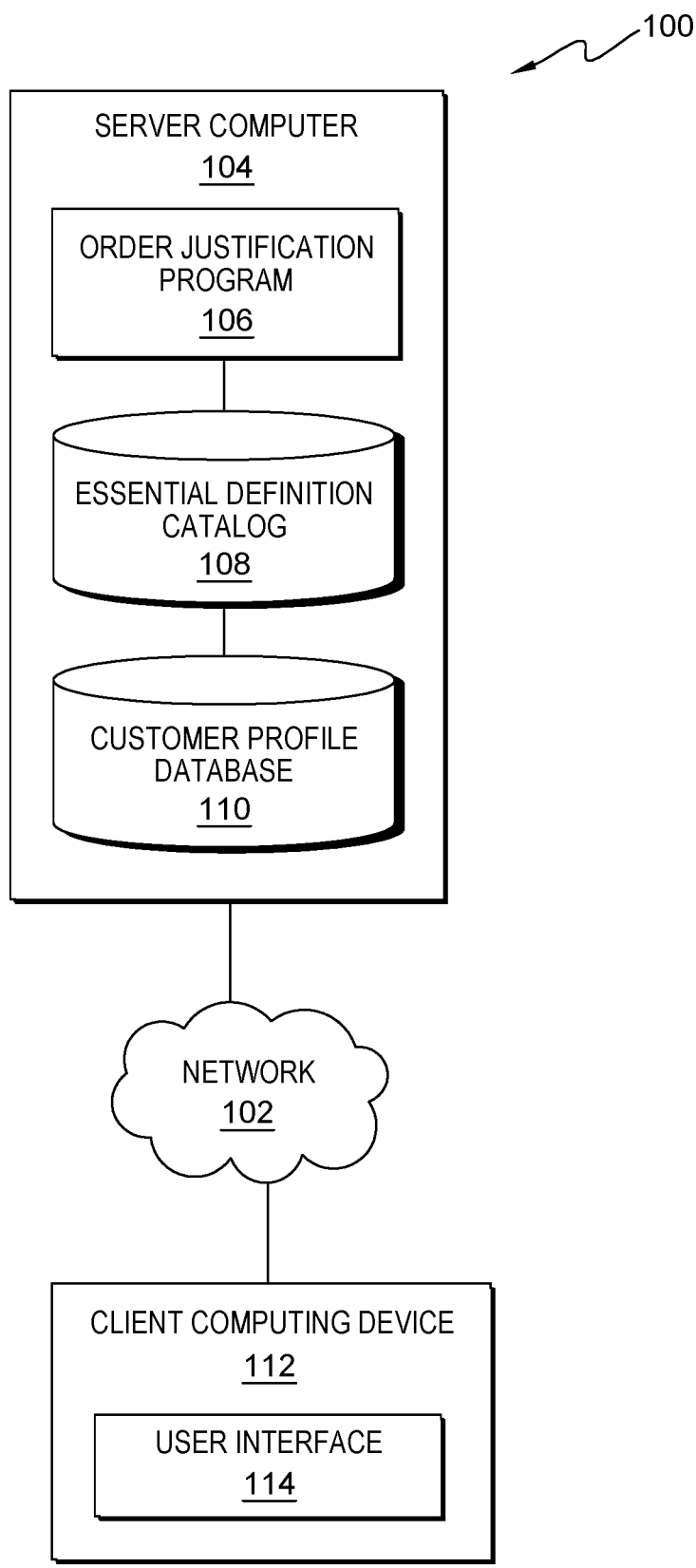
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed," as used herein, describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104 and client computing device 112, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104, client computing device 112, and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any programmable electronic device capable of communicating with client computing device 112 and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes order justification program 106, essential definition catalog 108, and customer profile database 110. Server computer 104 may include internal and external hardware components, as depicted and described in further detail with respect to FIG. 3.

Order justification program 106 utilizes an ability to manipulate a product's essentialness factor to improve a satisfaction level of the product's consumer base. Order justification program 106 enables a product to be identified within an ecommerce supply chain and delivery path as essential when previously marked non-essential for online shipping order fulfillment and transactions. Order justification program 106 curates justification, prioritization, and essentialness from user context and metadata. Order justification program 106 has the ability to autonomously modify the order management product fulfillment identification of an essential product within a supply chain when generally deemed non-essential by an ecommerce entity. Order justification program 106 receives an order for a product. Order justification program 106 determines that the product that was ordered is non-essential. Order justification program 106 notifies the customer the product is not essential. Order justification program 106 receives an order justification from the customer. Order justification program 106 analyzes the sentiment in the order justification. Order justification program 106 may also analyze one or more other factors. Based on the justification sentiment and the one or more other factors, order justification program 106 determines whether the essentialness of the product exceeds an essentialness threshold. If the essentialness of the product exceeds the threshold, then order justification program 106 changes the essential definition of the product and processes the order for the customer. In the depicted embodiment, order justification program 106 is a standalone program. In another embodiment order justification program 106 may be integrated into another software product, such as an order fulfillment or supply chain engine. In an embodiment, ecommerce entities and customers of the ecommerce entities opt-in to the use of order justification program 106. Order justification program 106 is depicted and described in further detail with respect to FIG. 2.

Essential definition catalog 108 is a repository for a corpus of products sold by an ecommerce entity that includes definitions and policies for when each item in the catalog is considered essential. Essential definition catalog 108 includes a list of all essential items and non-essential items to be stocked within one or more warehouses associated with the ecommerce entity. Essential definition catalog 108 may include a plurality of definitions of essentialness for each item, depending on circumstances. For example, snow shovels may be defined as essential during winter months in northern climates. In another example, surgical masks may be defined as essential during a global pandemic. Essential definition catalog 108 includes definitions of circumstances and associated policies such that a supply chain organization associated with the ecommerce entity can invoke one or more policies to influence the prioritization of delivering each product. In the depicted embodiment, essential definition catalog 108 resides on server computer 104. In another embodiment, essential definition catalog 108 may reside elsewhere within distributed data processing environment 100, provided order justification program 106 has access to essential definition catalog 108. Essential definition catalog 108 can be implemented with any type of storage device capable of storing data and configuration files that can be accessed and utilized by order justification program 106, such as a database server, a hard disk drive, or a flash memory.

Customer profile database 110 stores information associated with customers and/or consumers of products sold by the ecommerce entity associated with essential definition catalog 108. In the depicted embodiment, customer profile database 110 resides on server computer 104. In another embodiment, customer profile database 110 may reside elsewhere within distributed data processing environment 100, provided order justification program 106 has access to customer profile database 110. In the depicted embodiment, essential definition catalog 108 and customer profile database 110 are separate entities. In another embodiment, essential definition catalog 108 and customer profile database 110 may be included in a combined database. A database is an organized collection of data. Customer profile database 110 can be implemented with any type of storage device capable of storing data and configuration files that can be accessed and utilized by order justification program 106, such as a database server, a hard disk drive, or a flash memory. Customer profile database 110 stores data associated with a customer of the ecommerce entity, including, but not limited to, name, address, phone number, email address, social network affiliation, credit card number, shopping history, etc.

The present invention may contain various accessible data sources, such as essential definition catalog 108 and customer profile database 110, that may include personal data, content, or information the user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Order justification program 106 enables the authorized and secure processing of personal data. Order justification program 106 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Order justification program 106 provides information regarding personal data and the nature (e.g., type, scope, purpose, duration, etc.) of the processing. Order justification program 106 provides the user with copies of stored personal data. Order justification program 106 allows the correction or completion of incorrect or incomplete personal data. Order justification program 106 allows the immediate deletion of personal data.

Client computing device 112 can be one or more of a laptop computer, a tablet computer, a smart phone, a smart watch, a smart speaker, or any programmable electronic device capable of communicating with various components and devices within distributed data processing environment 100, via network 102. Client computing device 112 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, the wearable computer may be in the form of a head mounted display. The head mounted display may take the form-factor of a pair of glasses. In an embodiment, the wearable computer may be in the form of a smart watch or a smart tattoo. In an embodiment, client computing device 112 may be integrated into a vehicle of the user. For example, client computing device 112 may include a heads-up display in the windshield of the vehicle. In general, client computing device 112 represents one or more programmable electronic devices or combination of programmable electronic devices capable of executing machine readable program instructions and communicating with other computing devices (not shown) within distributed data processing environment 100 via a network, such as network 102. Client computing device 112 includes an instance of user interface 114.

User interface 114 provides an interface between order justification program 106 on server computer 104 and a user of client computing device 112. In one embodiment, user interface 114 is mobile application software. Mobile application software, or an "app," is a computer program designed to run on smart phones, tablet computers and other mobile devices. In one embodiment, user interface 114 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 114 enables a user of client computing device 112 to create an account with an ecommerce entity and input account and/or profile information, which may include, but is not limited to, a name, an address, an email address, a credit card number, an account number, an employer, etc. User interface 114 also enables a user of client computing device 112 to input essential order justification information for analysis by order justification program 106. Further, user interface 114 enables a user of client computing device 112 to opt-in or opt-out of order justification program 106.

Figure 2:
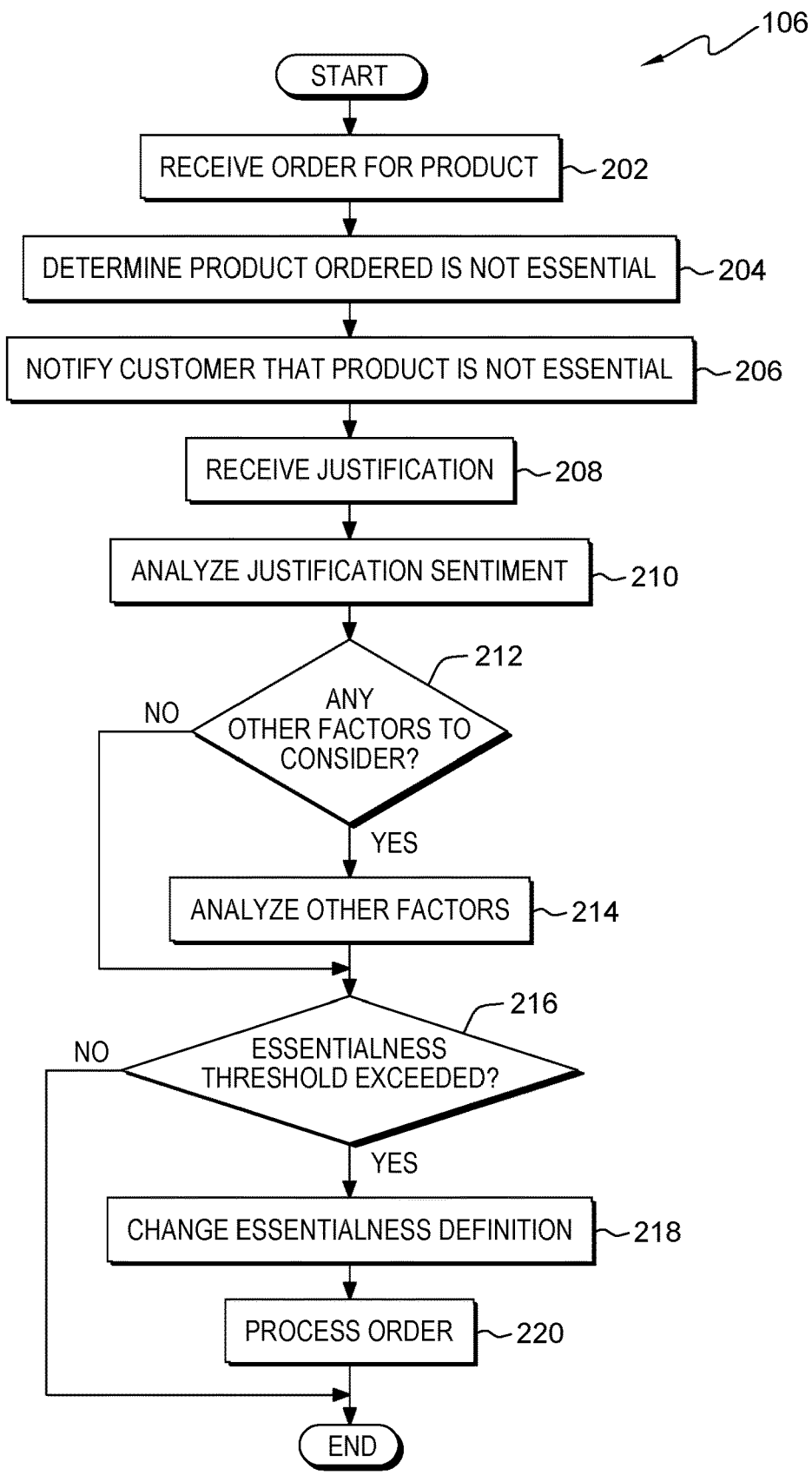
FIG. 2 is a flowchart depicting operational steps of an order justification program, on a server computer within the distributed data processing environment of FIG. 1, for modifying the essentialness of an ecommerce order, in accordance with an embodiment of the present invention.

FIG. 2 is a flowchart depicting operational steps of order justification program 106, on server computer 104 within distributed data processing environment 100 of FIG. 1, for modifying the essentialness of an ecommerce order, in accordance with an embodiment of the present invention.

Order justification program 106 receives an order for a product (step 202). In an embodiment, as a customer of an ecommerce entity places an order for a product with the entity, order justification program 106 receives the order. In one embodiment, order justification program 106 may receive the order as the customer places the product in a virtual shopping cart. In another embodiment, order justification program 106 may receive the order after the customer enters payment information.

Order justification program 106 determines the product is not essential (step 204). In an embodiment, prior to processing the order for the product, order justification program 106 compares the product in the order to the corpus of products included in essential definition catalog 108 and determines the product is not defined as essential under current circumstances.

Order justification program 106 notifies the customer that the product is not essential (step 206). In an embodiment, order justification program 106 sends an alert or notification to the customer to indicate that if the customer proceeds with ordering the product, then shipping of the product may be delayed because the product is not considered essential. In one embodiment, order justification program 106 provides the notification via user interface 114. In an embodiment, the notification includes the option of providing a justification for the essentialness of the product to the customer. For example, order justification program 106 may display a message that says, "If you need the product right away, please click the JUSTIFICATION button to provide additional information regarding your need for the product." In another example, order justification program 106 may provide a field in the order form for a customer to enter a justification.

Order justification program 106 receives a justification (step 208). In an embodiment, when the customer provides a justification for the order, via user interface 114, order justification program 106 receives the justification. For example, a customer needs to have a laptop dongle to ensure the customer can work from home during a national emergency. The customer fills out the justification field with information that conveys that the item is mandatory for the job.

Order justification program 106 analyzes the sentiment of the justification (step 210). The sentiment of the justification may indicate whether the product is truly essential to the customer or to the customer's current circumstances or whether the customer is just impatient to receive the product. In an embodiment, order justification program 106 uses one or more natural language processing (NLP) techniques, such as a cognitive NLP engine, natural language classification (NLC), or natural language understanding (NLU), to parse the text of the justification in order to determine the sentiment of the justification by the customer. In another embodiment, order justification program 106 provides the justification to a data steward associated with the ecommerce entity, the data steward determines the sentiment of the justification and feeds the sentiment back to order justification program 106. In an embodiment, as part of the analysis of the sentiment, order justification program 106 may assign a value to the sentiment that can be compared to a threshold value. For example, order justification program 106 may assign a number between one and ten as a value of essentialness. In another example, order justification program 106 may assign a percentage of justification as a value of essentialness.

Order justification program 106 determines whether there are any other factors to consider (decision block 212). In addition to the customer-provided justification text, there may be other factors relevant to whether a product is essential to the customer. Order justification program 106 may consider data or metadata included in customer profile database 110 or in the order itself. For example, the time of day that the order was placed may indicate an urgency of the order. In another example, the location of the customer may indicate whether or not a product is essential, such as if order justification program 106 determines the location of the customer, via global positioning service (GPS) coordinates or via a shipping address added to the order, is in a geographical location that is not the home or office of the customer. In a further example, order justification program 106 may determine a job or career of the customer, from customer profile database 110, and also consider an economic impact factor, such as if the product is critical to performing the customer's job. In an embodiment, order justification program 106 can use data from one or more Internet of Things (IoT) devices to determine criticality of the product to the customer. For example, order justification program 106 may detect that an IoT oven is having issues or is in maintenance mode, so the order of microwavable meals is important. In another example, order justification program 106 may detect that the customer's smart phone is unresponsive, so a purchase of a new smart phone should be prioritized. In a further example, order justification program 106 may detect the customer's speech via a digital assistant in the customer's home that indicates concern for losing a job if the customer does not receive the ordered product immediately.

If order justification program 106 determines there are other factors to consider ("yes" branch, decision block 212), then order justification program 106 analyzes the other factors (step 214). In an embodiment, order justification program 106 analyzes the various factors, as described above, that may be relevant to the prioritization of the customer's order. In one embodiment, order justification program 106 assigns a weight to each of the factors to enable calculating a weighted essentialness value. In another embodiment, order justification program 106 may create a count of the number of relevant factors as a measurement of essentialness.

Responsive to analyzing the other factors, or if order justification program 106 determines there are no other factors to consider ("no" branch, decision block 212), then order justification program 106 determines whether the essentialness threshold is exceeded (decision block 216). In an embodiment, based on the analysis of the justification sentiment and the analysis of any other relevant factors, order justification program 106 determines whether the essentialness value of the product the customer plans to order exceeds an essentialness threshold. In an embodiment, the ecommerce entity establishes the essentialness threshold, and may change the threshold as circumstances dictate. As described above, order justification program 106 may measure essentialness in a plurality of ways. For example, if order justification program 106 assigned a percentage to the justification of 50% and the threshold is 80%, then the essentialness does not exceed the threshold. In one embodiment, the threshold may have two or more criteria. For example, if order justification program 106 assigned a percentage to the justification of 50% and a count of additional factors is three, then if the threshold is 50% justification plus two additional factors, then the essentialness exceeds the threshold.

If order justification program 106 determines the essential threshold is exceeded ("yes" branch, decision block 216), then order justification program 106 changes the essentialness definition of the product (step 218). In an embodiment, order justification program 106 changes the definition of essentialness of the product in essential definition catalog 108 to enable the order of the product to be processed as an essential item. In one embodiment, order justification program 106 changes the definition temporarily such that the new definition applies only to the current order from the current customer. In another embodiment, order justification program 106 changes the definition permanently or for some set period of time. In an embodiment, if order justification program 106 determines that a number of customers that have had similar justifications for the prioritization of the same or similar products exceeds a threshold, then order justification program 106 changes the essentialness definition of the product. By changing the essentialness definition of a product, supply chain and delivery schedules are adjusted to accommodate the reprioritization and need.

Responsive to changing the essential definition of the product, or if order justification program 106 determines the essential threshold is not exceeded ("no" branch, decision block 216), then order justification program 106 processes the order (step 220). In an embodiment where order justification program 106 changed the essential definition of the product, order justification program 106 processes the order to ship without delay according to a shipping policy for an essential item. In an embodiment where order justification program 106 determines the essentialness threshold is not exceeded, order justification program 106 processes the order to ship as other, non-essential prioritization allows. For example, the product may ship based on user location and other factors of need, such as based on government orders, news, market conditions, etc.

As ecommerce entities employ the use of order justification program 106, the result may be a change in behavior with regards to inventory management policy within purchasing inventory, storing inventory, and profiting from inventory. Use of order justification program 106 can change a demand-based supply chain to a need-based supply chain as a new way of handling incoming information and requests. In addition, as ecommerce entities employ the use of order justification program 106, the result may include a change in behavior within its delivery schedule to ensure high priority, essential items are shipped before non-essential items with continuously changing declarations. An item may be changed from essential to non-essential based on capacity, schedule, and new orders, while an item may be changed from non-essential to essential based on necessity and curated justification.

Figure 3:
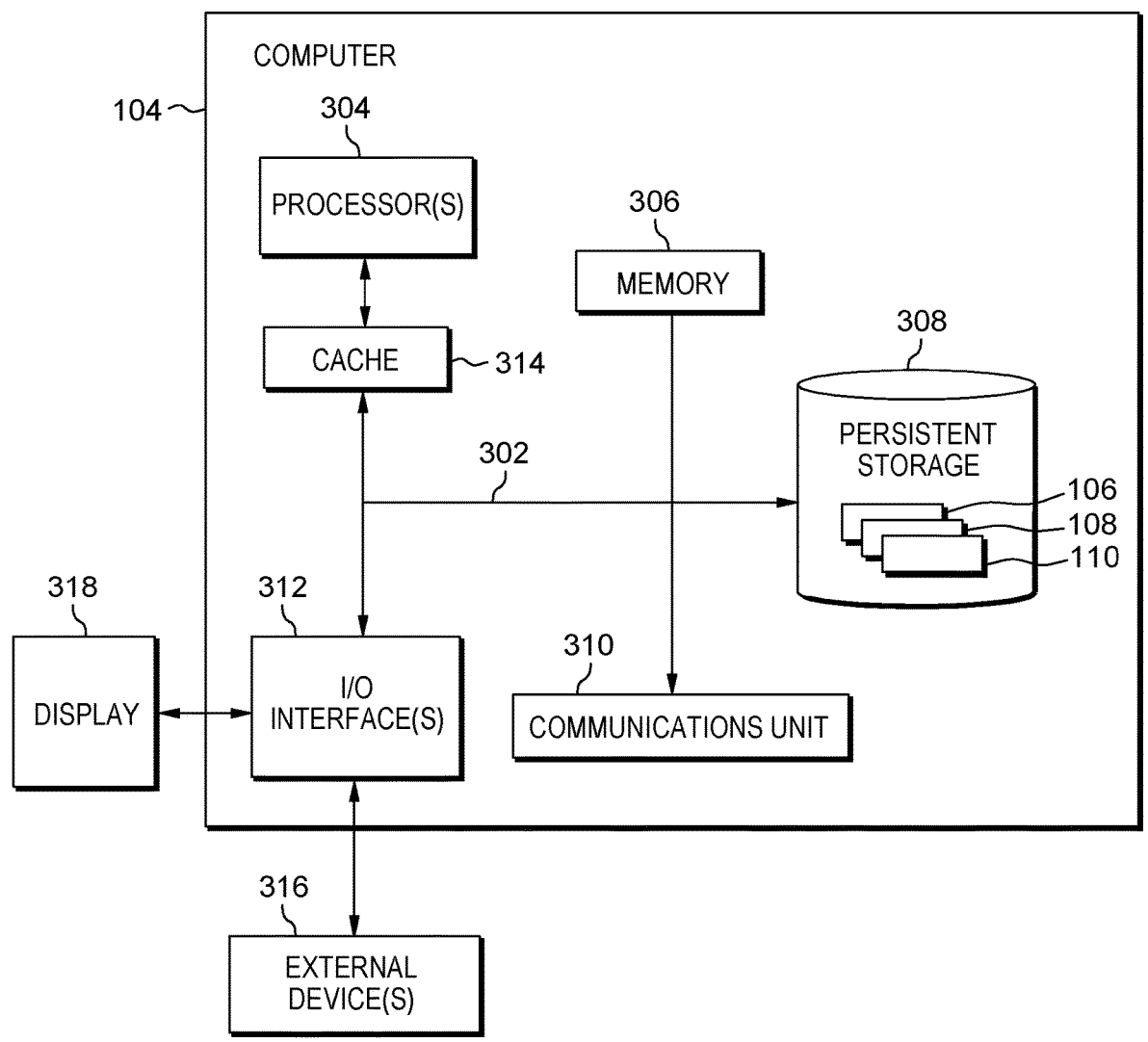
FIG. 3 depicts a block diagram of components of the server computer executing the order justification program within the distributed data processing environment of FIG. 1, in accordance with an embodiment of the present invention.

FIG. 3 depicts a block diagram of components of server computer 104 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computer 104 can include processor(s) 304, cache 314, memory 306, persistent storage 308, communications unit 310, input/output (I/O) interface(s) 312 and communications fabric 302. Communications fabric 302 provides communications between cache 314, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM). In general, memory 306 can include any suitable volatile or non-volatile computer readable storage media. Cache 314 is a fast memory that enhances the performance of processor(s) 304 by holding recently accessed data, and data near recently accessed data, from memory 306.

Program instructions and data used to practice embodiments of the present invention, e.g., order justification program 106, essential definition catalog 108, and customer profile database 110, are stored in persistent storage 308 for execution and/or access by one or more of the respective processor(s) 304 of server computer 104 via cache 314. In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of client computing device 112. In these examples, communications unit 310 includes one or more network interface cards. Communications unit 310 may provide communications through the use of either or both physical and wireless communications links. Order justification program 106, essential definition catalog 108, customer profile database 110, and other programs and data used for implementation of the present invention, may be downloaded to persistent storage 308 of server computer 104 through communications unit 310.

I/O interface(s) 312 allows for input and output of data with other devices that may be connected to server computer 104. For example, I/O interface(s) 312 may provide a connection to external device(s) 316 such as a keyboard, a keypad, a touch screen, a microphone, a digital camera, and/or some other suitable input device. External device(s) 316 can also include portable computer readable storage media such as, for example, thumb drives, portable optical or magnetic disks, and memory cards. Software and data used to practice embodiments of the present invention, e.g., order justification program 106, essential definition catalog 108, and customer profile database 110 on server computer 104, can be stored on such portable computer readable storage media and can be loaded onto persistent storage 308 via I/O interface(s) 312. I/O interface(s) 312 also connect to a display 318.

Display 318 provides a mechanism to display data to a user and may be, for example, a computer monitor. Display 318 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    receiving, by one or more computer processors, an order for a product from a customer;
    determining, by one or more computer processors, that the product is deemed non-essential;
    notifying, by one or more computer processors, the customer that the product is non-essential;
    providing, by one or more computer processors, a button in a user interface for the customer to respond with a justification of an essentialness of the product;
    receiving, by one or more computer processors, the justification of the essentialness of the product from the customer;
    analyzing, by one or more computer processors, a sentiment of the justification, wherein analyzing the sentiment of the justification includes parsing the text of the justification with a cognitive natural language processing (NLP) engine;
    based on the analysis of the sentiment, determining, by one or more computer processors, that the product is essential; and
    processing, by one or more computer processors, the order as essential.

2. The computer-implemented method of claim 1, wherein determining that the product is essential further comprises determining, by one or more computer processors, that the essentialness of the product exceeds an essentialness threshold.

3. The computer-implemented method of claim 1, further comprising:
    determining, by one or more computer processors, whether there are one or more other factors to consider in addition to the justification;
    responsive to determining there are one or more other factors to consider, analyzing, by one or more computer processors, the one or more other factors; and
    based on the analysis of the sentiment and on the analysis of the other factors, determining, by one or more computer processors, that the product is essential.

4. The computer-implemented method of claim 3, wherein the one or more other factors are one or more of data from a profile of the customer, metadata associated with the customer, a location of the customer, a job of the customer, a name of the customer, an address of the customer, a phone number of the customer, an email address of the customer, a social network affiliation of the customer, a credit card number of the customer, and a shopping history of the customer.

5. The computer-implemented method of claim 3, wherein analyzing the one or more other factors comprises detecting, by one or more computer processors, data from an Internet of Things device.

6. The computer-implemented method of claim 1, further comprising:
    changing, by the one or more computer processors, a definition of essentialness of the product in a product database.

7. The computer-implemented method of claim 1, wherein analyzing the sentiment of the justification uses one or more natural language processing techniques.

8. The computer-implemented method of claim 1, responsive to determining that the product is essential, autonomously modifying, by one or more computer processors, an identification of the product in a product database.

9. A computer program product comprising:
    one or more computer readable storage media and program instructions collectively stored on the one or more computer readable storage media, wherein the program instructions are computer-implementable instructions for causing one or more processors to carry out operations, the stored program instructions comprising:

program instructions to receive an order for a product from a customer;

program instructions to determine that the product is deemed non-essential;

program instructions to notify the customer that the product is non-essential;

program instructions to provide a button in a user interface for the customer to respond with a justification of an essentialness of the product;

program instructions to receive the justification of the essentialness of the product from the customer;

program instructions to analyze a sentiment of the justification, wherein the program instructions to analyze the sentiment of the justification include program instructions to parse the text of the justification with a cognitive natural language processing (NLP) engine;

program instructions to, based on the analysis of the sentiment, determine that the product is essential; and program instructions to process the order as essential.

10. The computer program product of claim 9, wherein program instructions to determine that the product is essential comprise program instructions to determine that the essentialness of the product exceeds an essentialness threshold.

11. The computer program product of claim 9, the stored program instructions further comprising:

program instructions to determine whether there are one or more other factors to consider in addition to the justification;

program instructions to, responsive to determining there are one or more other factors to consider, analyze the one or more other factors; and program instructions to, based on the analysis of the sentiment and on the analysis of the other factors, determine that the product is essential.

12. The computer program product of claim 11, wherein the one or more other factors are one or more of data from a profile of the customer, metadata associated with the customer, a location of the customer, a job of the customer, a name of the customer, an address of the customer, a phone number of the customer, an email address of the customer, a social network affiliation of the customer, a credit card number of the customer, and a shopping history of the customer.

13. The computer program product of claim 11, wherein program instructions to analyze the one or more other factors comprise program instructions to detect data from an Internet of Things device.

14. The computer program product of claim 9, the stored program instructions further comprising:

program instructions to change a definition of essentialness of the product in a product database.

15. The computer program product of claim 9, wherein program instructions to analyze the sentiment of the justification use one or more natural language processing techniques.

16. A computer system comprising:

one or more computer processors;

one or more computer readable storage media; and program instructions collectively stored on the one or more computer readable storage media for execution by at least one of the one or more computer processors, the stored program instructions comprising:

program instructions to receive an order for a product from a customer;

program instructions to determine that the product is deemed non-essential;

program instructions to notify the customer that the product is non-essential;

program instructions to provide a button in a user interface for the customer to respond with a justification of an essentialness of the product;

program instructions to receive the justification of the essentialness of the product from the customer;

program instructions to analyze a sentiment of the justification, wherein the program instructions to analyze the sentiment of the justification include program instructions to parse the text of the justification with a cognitive natural language processing (NLP) engine;

program instructions to, based on the analysis of the sentiment, determine that the product is essential; and program instructions to process the order as essential.

17. The computer system of claim 16, wherein program instructions to determine that the product is essential comprise program instructions to determine the essentialness of the product exceeds an essentialness threshold.

18. The computer system of claim 16, the stored program instructions further comprising:

program instructions to determine whether there are one or more other factors to consider in addition to the justification;

program instructions to, responsive to determining there are one or more other factors to consider, analyze the one or more other factors; and program instructions to, based on the analysis of the sentiment and on the analysis of the other factors, determine that the product is essential.

19. The computer system of claim 18, wherein the one or more other factors are one or more of data from a profile of the customer, metadata associated with the customer, a location of the customer, a job of the customer, a name of the customer, an address of the customer, a phone number of the customer, an email address of the customer, a social network affiliation of the customer, a credit card number of the customer, and a shopping history of the customer.

20. The computer system of claim 18, wherein program instructions to analyze the one or more other factors comprise program instructions to detect data from an Internet of Things device.

* * * * *